United States Patent
Wan et al.

(10) Patent No.: US 12,204,578 B2
(45) Date of Patent: Jan. 21, 2025

(54) MACHINE LEARNING BASED DATABASE SEARCH AND KNOWLEDGE MINING

(71) Applicant: BANK OF MONTREAL, Toronto (CA)

(72) Inventors: Bo Wan, Toronto (CA); Matthew Wan, Toronto (CA); Jon Wang, Toronto (CA)

(73) Assignee: Bank of Montreal, Toronto (CA)

( * ) Notice: Subject to any disclaimer, the term of this patent is extended or adjusted under 35 U.S.C. 154(b) by 1100 days.

(21) Appl. No.: 16/951,714

(22) Filed: Nov. 18, 2020

(65) Prior Publication Data

US 2021/0158176 A1 May 27, 2021

Related U.S. Application Data

(60) Provisional application No. 62/939,201, filed on Nov. 22, 2019.

(51) Int. Cl.

| | |
|---|---|
| *G06N 5/022* | (2023.01) |
| *G06F 16/36* | (2019.01) |
| *G06F 16/901* | (2019.01) |
| *G06F 18/22* | (2023.01) |
| *G06F 40/205* | (2020.01) |
| *G06F 40/30* | (2020.01) |

(52) U.S. Cl.
CPC ........ *G06F 16/367* (2019.01); *G06F 16/9024* (2019.01); *G06F 18/22* (2023.01); *G06F 40/205* (2020.01); *G06F 40/30* (2020.01); *G06N 5/022* (2013.01)

(58) Field of Classification Search
CPC .... G06F 16/9024; G06F 40/205; G06F 40/30; G06F 16/367; G06F 18/22; G06N 5/022
See application file for complete search history.

(56) References Cited

U.S. PATENT DOCUMENTS

| | | | |
|---|---|---|---|
| 7,627,559 B2 * | 12/2009 | Srivastava | G06Q 30/02 |
| 11,854,535 B1 * | 12/2023 | Zhang | G10L 15/22 |
| 2003/0195877 A1 * | 10/2003 | Ford | G06F 16/35 |
| 2019/0164022 A1 * | 5/2019 | Linton | G06F 16/2457 |
| 2020/0364511 A1 * | 11/2020 | Brown | G06F 16/3329 |

* cited by examiner

*Primary Examiner* — Kyle R Stork
(74) *Attorney, Agent, or Firm* — Foley & Lardner LLP

(57) ABSTRACT

Disclosed herein are embodiments of systems, methods, and products comprises a server for database search and knowledge mining. The server may learn different table's semantics, relationships, and usage by parsing historical query logs and analyzing tables' metadata (e.g., table descriptions). The analytic server may generate a graph database based on the table relationships obtained from the parsing. The graph database may be a relationship graph where tables are the nodes and edges represent the relationships among tables. When the server receives a query, the server extract semantics of the query, and return a set of tables that are semantically similar to the query. The set of tables may be a list of tables whose semantic similarities with the query satisfies a threshold. The analytic server may further generate a graph including the list of tables to show the relationships of these tables.

20 Claims, 14 Drawing Sheets

MACHINE LEARNING BASED DATABASE SEARCH AND KNOWLEDGE MINING

CROSS REFERENCE TO RELATED APPLICATIONS

This application claims priority to U.S. Provisional Patent Application No. 62/939,201, filed Nov. 22, 2019, which is incorporated by reference herein in its entirety.

TECHNICAL FIELD

This application relates generally to methods and systems for artificial intelligence applications for database searching and knowledge mining.

BACKGROUND

With recent technological development in big data technology, most companies and organizations utilize multiple data centers to store their data. Some data centers maintain hundreds of terabytes of data organized in millions of tables. However, using a high number of tables has created multiple technical challenges. For instance, it may be difficult to monitor various tables and the data included in those tables. Further, it is even more difficult to identify relationships among various tables and how to efficiently retrieve different tables to analyze/query data.

Conventional software solutions have proven to be ineffective with regard to the above-described problem. Conventional querying software solutions search tables based on keyword matching. For instance, conventional querying software solutions search a table that includes a keyword corresponding to a query command received. However, the conventional querying software solutions suffer from technical shortcomings. For instance, conventional querying software solutions may only identify tables that correspond to the exact keywords within the query commands. Conventional software solutions may also exclude other tables that include similar and relevant data but exclude the exact keywords within the query command, which leads to incomplete results. For example, if an end user searches for "money-laundering," the system may only return every table that includes the exact phrase "money-laundering."

Moreover, conventional querying software solutions shift the burden of identifying relevant tables to the end user, which is highly undesirable. For instance, the end user may not know all the relevant keywords and their corresponding tables within a data center. As a result, the end user may receive incomplete results. For example, if instead of searching for "money-laundering," the end user searches for "fraud detection," conventional querying software may return no matches, even though the tables for "money-laundering" should include information related to "fraud detection."

As a result, conventional querying software solutions based on keyword matching may not be able to identify all of the tables relevant to the end user's request. The conventional querying software may fail to capture the semantics of the end user's request and fail to retrieve tables that are semantically similar to the request. Thus, the results of the conventional querying software solutions may not be comprehensive and complete, because data from other tables (e.g., tables that include similar information but not the exact keywords) are missing.

Conventional software solutions also fail to identify a relationship between various tables storing/indexing the data. For instance, conventional querying software solutions simply provide an index of all tables that include a keyword but fail to provide more details on how the identified tables are interrelated.

SUMMARY

For the aforementioned reasons, what is desired are systems and methods that use artificial intelligence in conjunction with various natural language processing and other semantic analysis protocols to learn/identify data associated with various tables, the tables' semantics, and their relationships with each other. Embodiments disclosed herein address the above challenges by providing a machine learning based table and code snippet search system that can artificially learn the tables' semantics, relationships to other tables, and usage by analyzing historical execution logs (e.g., previous queries). Specifically, the embodiments disclosed herein may provide a system that can understand a query having a natural language question, extract semantics from the question, and retrieve and suggest a set of tables that are semantically associated with the question. The above-described systems and methods may also provide more details regarding how the suggested tables have been used in historical queries and the code snippets indicating the relationships of the suggested tables based on historical usage.

The embodiments disclosed herein may include two stages. The first stage of natural language semantic search may provide semantic similarity search results including tables that are semantically similar to the query or question (e.g., relevant to the query or question). The second stage may refine the semantic similarity search results to provide more details on how to use these tables (e.g., the relationships of the returned tables).

As discussed above, the embodiments disclosed herein may learn the tables' semantics, relationships, and usage by analyzing historical execution logs. One of the technical advantages provided by the embodiments disclosed herein is that the training data is easy to acquire. Unlike conventional methods that require a large amount of documenting work for all of the table relationships, database design, and data lineage, the embodiments disclosed herein may have the capability of summarizing the tables' semantics and relationships from historical query logs and databases' metadata by leveraging machine learning techniques. These techniques do not require heavy computing resources to generate training data because the methods and systems described herein can be implemented using existing historical query execution logs.

In one embodiment, a method comprises parsing, by a server, historical queries from a historical query log to extract a plurality of tables associated with the historical queries and relationships between the plurality of tables; extracting, by the server, key phrases by executing a key phrase extraction model for table description of each table; generating, by the server, a corpus by combining the tables extracted from parsing and the key phrases extracted from the table descriptions; training, by the server based on the corpus, an artificial intelligence model by analyzing a frequency of combination of the tables and the key phrases for the historical queries, wherein the artificial intelligence model is configured to output a vector for each table and key phrase included in the corpus; generating, by the server, a graph based on the relationships between the tables, wherein the graph comprises a set of nodes interconnected via a set of edges where each node corresponds to a table and each edge corresponds to a relationship between at least two tables; upon receiving a query command, extracting, by the server, query key phrases by executing the key phrase extraction model for the query command; determining, by the server, a combination vector for the query command based on vectors of the query key phrases; calculating, by the server, a similarity score between the query command and each table based on the combination vector of the query command and the vector of each table; and displaying, by the server, one or more tables corresponding to a subset of the nodes and their respective edges within the graph, wherein the subset of the nodes corresponds to the one or more tables that satisfy a similarity score threshold.

In another embodiment, a system comprises a server comprising a processor and a non-transitory computer-readable medium containing instructions that when executed by the processor causes the processor to perform operations comprising parse historical queries from a historical query log to extract a plurality of tables associated with the historical queries and relationships between the plurality of tables; extract key phrases by executing a key phrase extraction model for table description of each table; generate a corpus by combining the tables extracted from parsing and the key phrases extracted from the table descriptions; train based on the corpus, an artificial intelligence model by analyzing a frequency of combination of the tables and the key phrases for the historical queries, wherein the artificial intelligence model is configured to output a vector for each table and key phrase included in the corpus; generate a graph based on the relationships between the tables, wherein the graph comprises a set of nodes interconnected via a set of edges where each node corresponds to a table and each edge corresponds to a relationship between at least two tables; upon receiving a query command, extract query key phrases by executing the key phrase extraction model for the query command; determine a combination vector for the query command based on vectors of the query key phrases; calculate a similarity score between the query command and each table based on the combination vector of the query command and the vector of each table; and display one or more tables corresponding to a subset of the nodes and their respective edges within the graph, wherein the subset of the nodes corresponds to the one or more tables that satisfy a similarity score threshold.

It is to be understood that both the foregoing general description and the following detailed description are exemplary and explanatory and are intended to provide further explanation of the disclosed embodiments and subject matter as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1A:
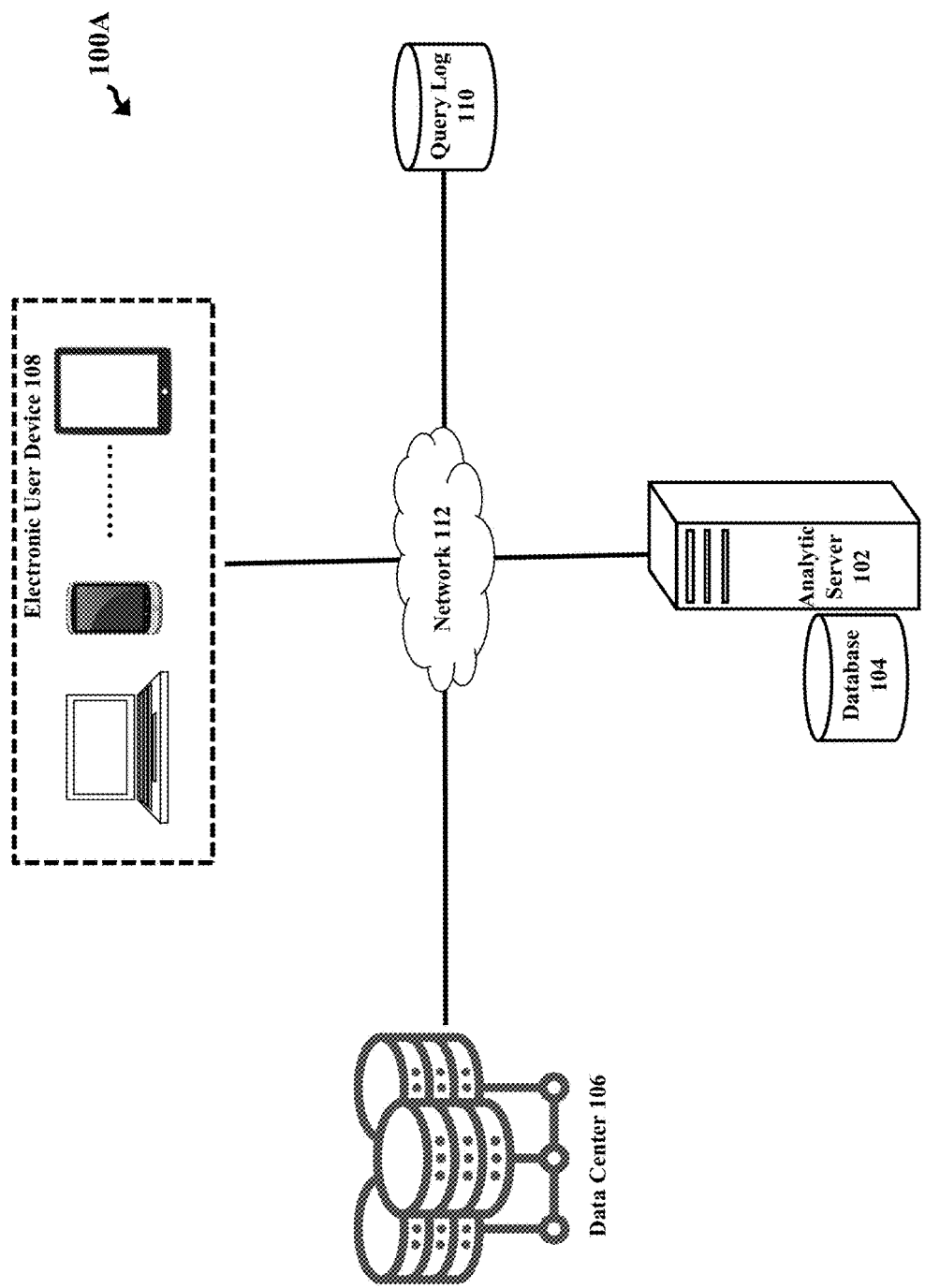
FIG. 1A illustrates components of a system for database search and knowledge mining, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Embodiments disclosed herein provide a system and method for database search and knowledge mining. An analytic server may artificially learn table's semantics, relationships, and usage by parsing historical query logs and analyzing each tables' metadata (e.g., table descriptions). Specifically, the analytic server may apply a query parser by parsing historical queries from the historical query logs to extract tables and table relationships. The analytic server may extract key phrases from table descriptions of each table. The analytic server may combine the tables and key phrases to form a corpus for model training. By analyzing the frequency of combination of key phrases and tables, the analytic server may train an embedding model based on the corpus. The embedding model may be trained to understand each table's semantics, usage and relationships with other tables. The embedding model may be configured to output a vector for each table and key phrase included in the corpus. The analytic server may generate a graph database based on the output table relationships from the query parser to build a relationship graph where tables are represented by nodes and relationships among the tables are represented by edges.

When the analytic server receives a query (e.g., question), the analytic server may understand the question and extract semantics from the question, retrieve and suggest a set of tables that are semantically similar with the question, and provide more details of how the suggested tables are being used, such as the code snippets based on historical usage. Specifically, the analytic server may extract key phrases from the question. The analytic server may further normalize the vectors of the question key phrases and combine the vectors into a combination vector. The analytic server may calculate a similarity score between each table in the databases and the question, and return and rank a list of tables whose similarity scores satisfy a threshold. The analytic server may further generate a subset of the graph database including the list of returned tables to show how the list of tables are connected together (e.g., representation of the relationships among these tables).

FIG. 1A illustrates components of a system 100A for database search and knowledge mining, according to an embodiment. The system 100A may comprise an analytic server 102, a database 104, a data center 106, an electronic user device 108, and query logs 110, that are connected with each other via hardware and software components of one or more network 112. Examples of the network 112 include, but are not limited to, Local Area Network (LAN), Wireless Local Area Network (WLAN), Metropolitan Area Network (MAN), Wide Area Network (WAN), and the Internet. The communication over the network 112 may be performed in accordance with various communication protocols, such as Transmission Control Protocol and Internet Protocol (TCP/IP), User Datagram Protocol (UDP), and IEEE communication protocols.

The analytic server 102 may be any computing device comprising a processor and other computing hardware and software components. The analytic server 102 may be logically and physically organized within the same or different devices or structures, and may be distributed across any number of physical structures and locations (e.g., cabinets, rooms, buildings, cities).

The analytic server 102 may be a computing device comprising a processing unit. The processing unit may include a processor with computer-readable medium, such as a random access memory coupled to the processor. The analytic server 102 may be running algorithms or computer executable program instructions, which may be executed by a single processor or multiple processors in a distributed configuration. The analytic server 102 may be configured to interact with one or more software modules of a same or a different type operating within the system 100A.

Non-limiting examples of the processor may include a microprocessor, an application specific integrated circuit, and a field programmable object array, among others. Non-limiting examples of the analytic server 102 may include a server computer, a workstation computer, a tablet device, and a mobile device (e.g., smartphone). Some embodiments may include multiple computing devices functioning as the analytic server 102. Some other embodiments may include a single computing device capable of performing the various tasks described herein.

The data center 106 may comprise a plurality of databases. The databases may comprise a large number of tables. For example, the databases of the data center 106 may include millions of tables. The databases of the data center 106 may utilize non-transitory machine-readable storage media, such as a hard disk or memory to store data. The data center 106 may further comprise a database management system that executes the code modules (e.g., SQL scripts) for various data queries and management functions.

The queries requesting various data from the data center 106 may be stored in one or more query logs. The query logs 110 may include all historical queries, such as SQL (structured query language) queries for the one or more databases of the data center 106. The query logs 110 may be stored in a database that is dynamically updated to include any new queries.

The analytic server 102 may perform data mining to obtain knowledge (using AI) on the databases and tables in the data center 106. More specifically, the analytic server 102 may parse the historical queries in the query logs 110. For each historical query, the analytic server 102 may use a query parser to create a parse tree. During the parsing, the analytic server 102 may decompose and label each semantic part of the query. By traversing the parse tree, the analytic server 102 may extract the tables used in the query and the relationships (e.g., respective connections/joints) of the tables.

The analytic server 102 may also extract key phrases from table descriptions by implementing a key phrase extraction model on table descriptions of each table in the databases of the data center 106. The analytic server 102 may implement a key phrase extraction model that utilizes natural language processing (NLP) to extract key phrases and features of each table's description.

The analytic server 102 may combine the tables and key phrases to form a corpus. By analyzing the frequency of combination of key phrases and tables, the analytic server 102 may train an embedding model based on the corpus. The embedding model may understand each table's semantic, usage, and relationships to other tables within the data center 106. The output of the embedding model may be a mapping function that projects each item (e.g., key phrases and tables) in the corpus to a vector. The vector may capture the semantics of each item. The purpose of the embedding module may be to convert key phrases and tables into mathematical representations, such as vectors. A mathematical representation may allow similar items (e.g., key phrases and tables) to be represented in similar ways. For example, the embedding model may output vectors for words such as "fraud detection" and "money-laundering" and the vectors may be mathematically similar, so that the analytic server 102 may determine that the two words are synonyms.

The analytic server 102 may also generate a graph database based on the output from the query parser. As discussed above, the query parser may extract the tables and the relationships among the tables based on the historical queries. The analytic server 102 may illustrate the relationships of the tables (how the tables of the data center 106 are connected together) as a graph (e.g., nodal structure). Specifically, based on the output from the query parser, the analytic server 102 may generate a graph database (e.g., a relationship graph) where tables are represented by nodes and relationships among different tables are represented by edges.

In operation, the analytic server 102 may receive a user query from the electronic user devices 108. The received user query may be a question or a sentence that requests tables (and data within the tables) relevant to certain information. Thus, the requested tables should be semantically similar to the query. The analytic server 102 may process the user query and return the results based on a natural language recommendation module. More specifically, the analytic server 102 may reuse the NLP preprocessing key phrase extraction model to extract key phrases from the query sentence. The analytic server 102 may retrieve the vectors representing the key phrases, normalize the vectors and combine the vectors into a combination vector.

The analytic server 102 may calculate a similarity score between each table within the databases and the query sentence. The analytic server 102 may calculate the cosine similarity based on the vector of each table and the combination vector of the query sentence. The analytic server 102 may then select the most similar tables with the similarity scores satisfying a threshold or top N tables with the highest similarity scores. The most similar tables may be a list of tables that are semantically similar to the query sentence and include the information relevant to the query sentence. The analytic server 102 may rank the list of tables based on the similarity scores and return the list of tables to the electronic user devices 108.

The analytic server 102 may also generate a subset of the graph database including the returned tables to illustrate how the returned tables are connected together and the relationships of these tables. Specifically, in the subset of the graph database, the nodes may represent the returned tables with table names as the nodes' properties and the edges may represent the relationships of the returned tables with the SQL code snippet as the edges' properties. The analytic server 102 may transmit the list of ranked tables and the subset of the graph database to the electronic user devices 108 to satisfy the user query.

The electronic user devices 108 may be any computing device allowing a user to interact with the analytic server 102. The electronic user devices 108 may be any computing device comprising a processor and non-transitory machine-readable storage medium. The examples of the computing device may include, but are not limited to, a desktop computer, a laptop, a personal digital assistant (PDA), a smartphone, a tablet computer, and the like. The electronic user devices 108 may comprise any number of input and output devices supporting various types of data, such as text, image, audio, video, and the like.

A user operating the electronic user devices 108 may issue an electronic request to query tables relevant to certain information. The user may initiate the electronic requests by interacting with a graphical user interface (GUI) provided by the analytic server 102. For example, the user may enter a query command (e.g., a query sentence) in the GUI to request one or more tables. The user may initiate the electronic requests through web applications (e.g., comprising a hyperlink of a website) and/or mobile applications installed in the electronic user devices 108. After retrieving the requested tables and the relationships of the tables, the analytic server 102 may return the results by rendering a GUI comprising the results on the electronic user devices 108.

The database 104 may be any non-transitory machine-readable storage media configured to store the corpus including the extracted tables and key phrases, the vectors, and the graph database. For example, the database 104 may comprise the parse tree, the extracted tables and the relationships of the tables from the query parser, such as the table names of the extracted tables, and the SQL snippets indicating the relationships of the tables. The database 104 may also comprise the extracted key phrases from the table descriptions of all the tables. In addition, the database 104 may comprise the vectors output from the embedding model that may correspond to the mathematical representations of the extracted tables and key phrases. The database 104 may further comprise the graph database comprising a graph where the tables are represented as nodes and edges represent the relationships among the tables. The database 104 may be a part of the analytic server 102. The database 104 may be a separate component in communication with the analytic server 102.

Figure 1B:
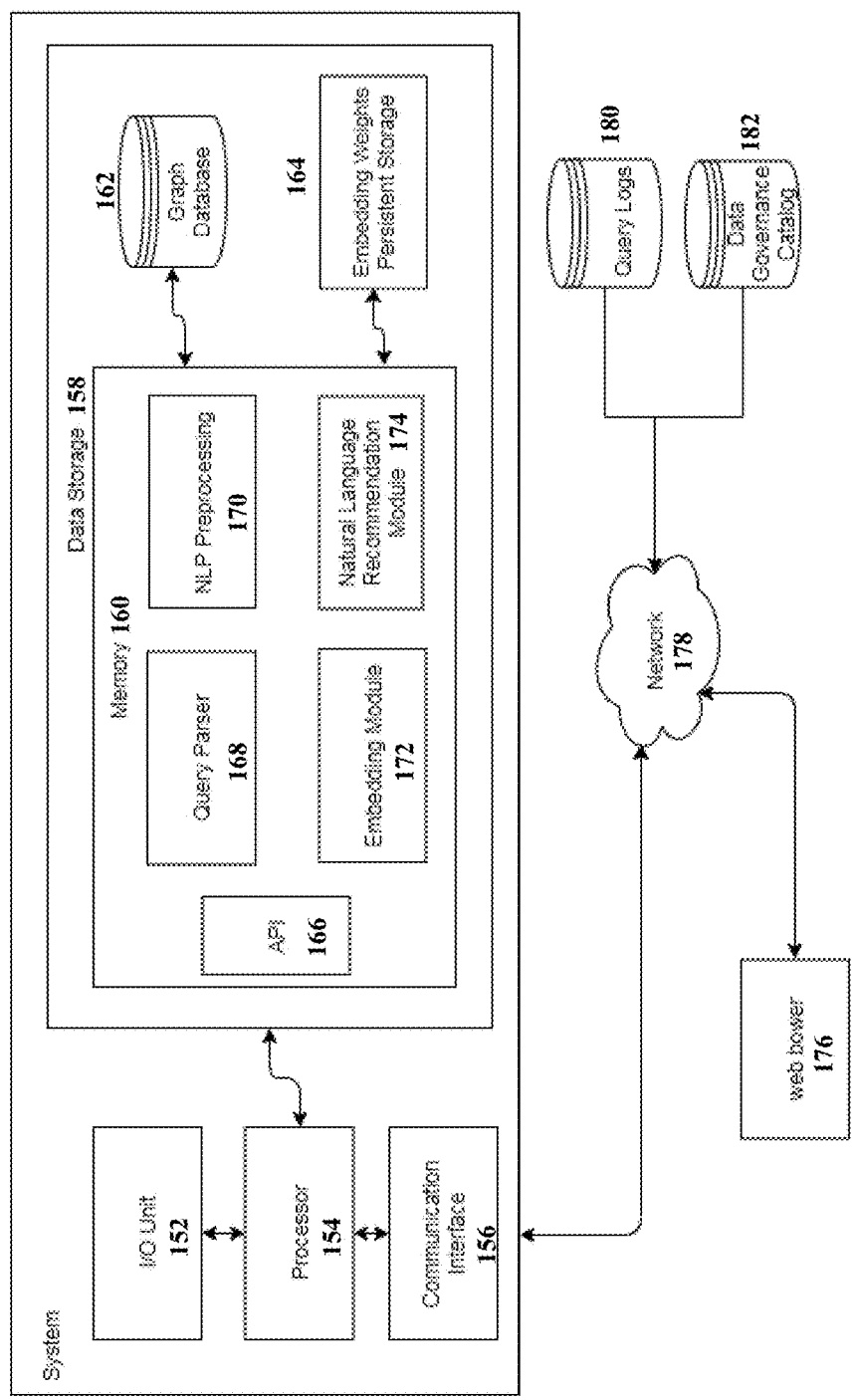
FIG. 1B illustrates system level design features of the embodiments disclosed herein, according to an embodiment

FIG. 1B illustrates system level design features 100B of the embodiments disclosed herein, according to an embodiment. The system level design features may comprise the components of various modules in the system. As shown in the figure, the analytic server may comprise I/O (input/output) unit 152, processor 154, communication interface 156, and data storage 158. The data storage 158 may comprise memory 160, graph database 162, and embedding weights persistent storage 164. The memory 160 may include API (application programming interface) 166, query parser 168, NLP preprocessing module 170 (e.g., key phrase extraction model), embedding module 172, and natural language recommendation module 174.

The query parser 168 in the memory may parse the historical query logs and extract tables and relationships of the tables. The NLP preprocessing module 170 may extract key phrases from the table descriptions and query sentences. The embedding module 172 may train the embedding model and output a vector for each table and key phrase. The natural language recommendation module 174 may process users' query sentences by implementing the trained models, retrieving the tables semantically similar to the query, and returning the most similar tables and the relationships of the similar tables.

The graph database 162 may include the relationship graphs of the tables extracted in the query parser. The embedding weights persistent storage 164 may store the vectors of tables and key phrases output by the embedding model in the memory.

The analytic server may receive the users' queries from a web browser 176 of the electronic user devices over the network 178. The analytic server may maintain one or more query logs 180 and a data governance catalog 182. The analytic server may use the query logs 180 in the query parser for extracting the tables and relationships of the tables based on the historical queries in the query logs.

Figure 2A:
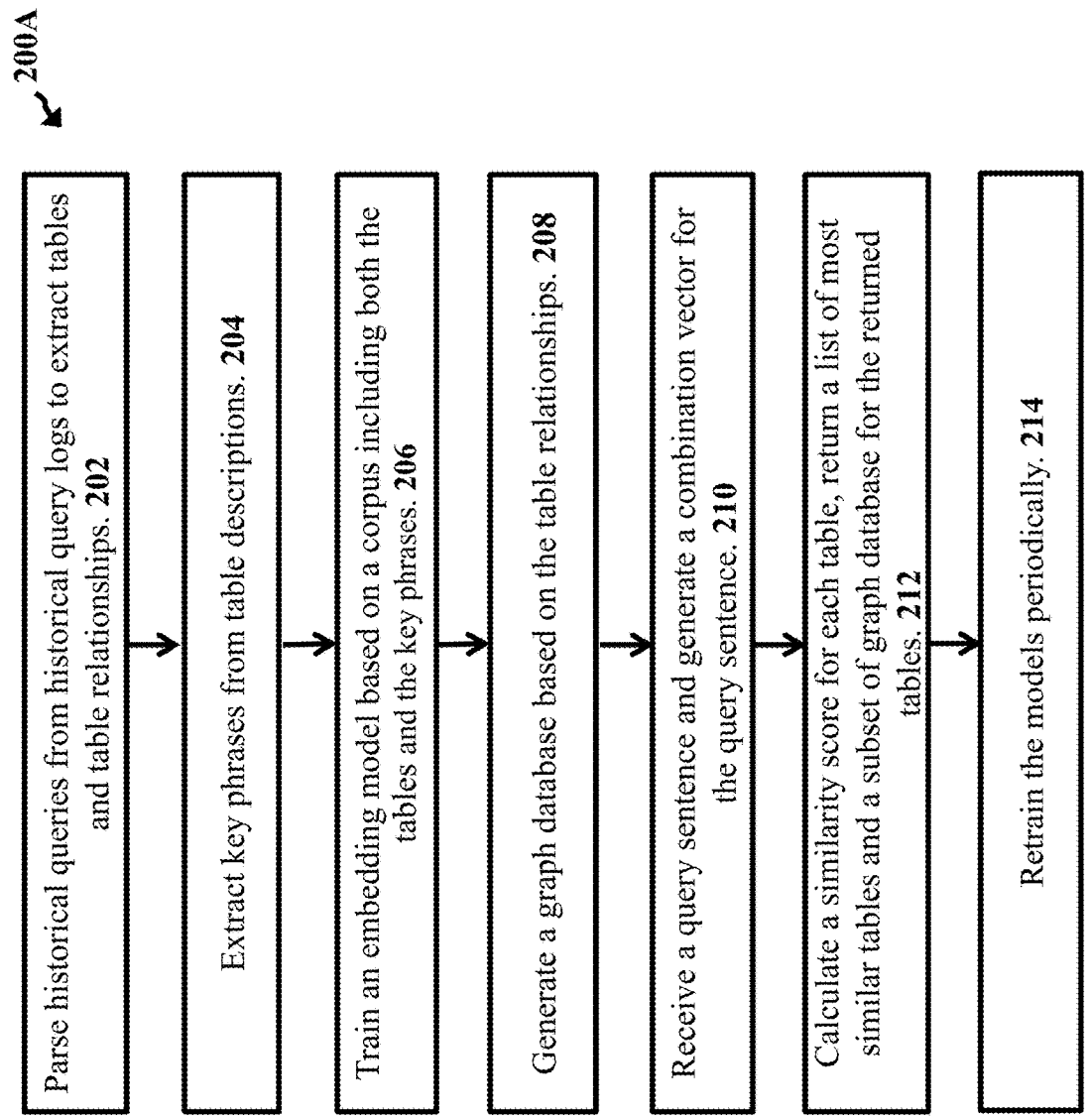
FIG. 2A illustrates a flowchart depicting operational steps for database search and knowledge mining, according to an embodiment.

FIG. 2A illustrates execution of a method 200A for database search and knowledge mining, according to an embodiment. Other embodiments may comprise additional or alternative steps, or may omit some steps altogether.

At step 202, the analytic server may parse historical queries from historical query logs to extract tables associated with the historical queries and relationships between the tables. The historical query logs (e.g., query execution logs) may include all the historical queries, such as SQL (structured query language) queries for the one or more databases of the system. The analytic server may load all SQL (structured query language) queries from a centralized log system. The analytic server may filter out the queries for granting access or dropping tables and parse the remaining queries to create parse tree structures. From the parse tree, the analytic server may generate a set of tables and the tables' relationships with each other.

For each query, the analytic server may use a query parser to create a parse tree. For example, the analytic server may implement the query parser to parse the SQL queries to build a parse tree. During parsing, the analytic server may decompose and label each semantic part of the query based on the query operation type. By traversing the parse tree, the analytic server may extract the tables used in the query and the relationships (e.g., respective connections/joints) of the tables.

In operation, the query parser may focus on the FROM clause and the WHERE clause in the SQL queries, as well as some specific clauses such as "insert into" and "update." The following query is an example SQL query:

```
SELECT NAME
FROM MDM.L1_MDM_PERSON
WHERE CONT_ID in (SELECT CONT_ID
    FROM MDM.L1_MDM_XHRUCUST
    WHERE RISKREASON LIKE 'isomethingi')
```

Figure 3A:
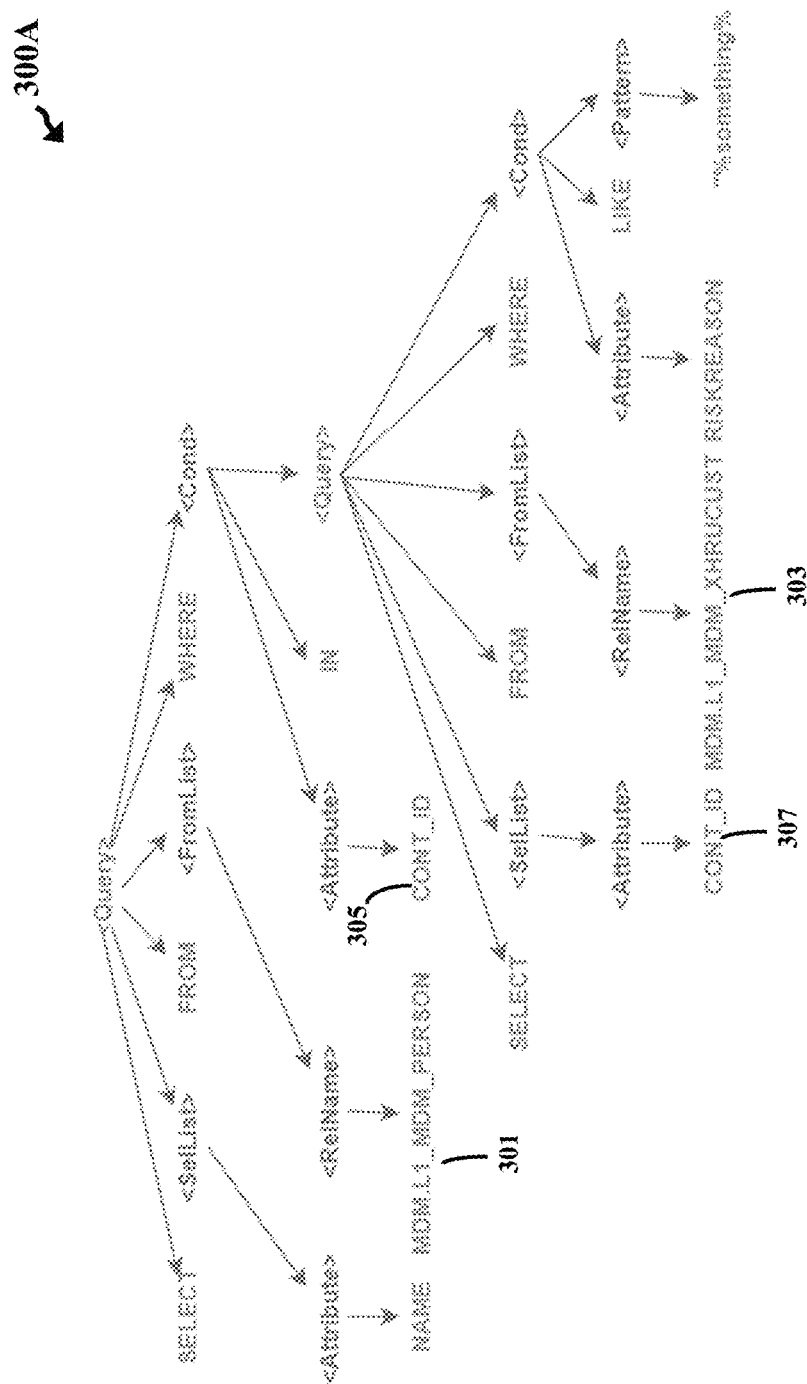
FIG. 3A illustrates a parsing tree of an example SQL query, according to an embodiment.

The above example SQL query is attempting to obtain the name of high-risk customers whose risk reason is "something." After running the SQL query parser, the analytics server may generate the parse tree as shown in FIG. 3A.

FIG. 3A illustrates a parsing tree 300A of the example SQL query, according to an embodiment. Utilizing the parse tree, the analytic server may identify two tables [MDM.L1_MDM_PERSON 301, MDM.L1_MDM_XHRUCUST 303]. These two table are joined by the Attribute [CONT_ID 305, CONT_ID 307].

The output of the query parser may follow the following format:

```
{query_text:{
    (Table_a, Table_b, {relationship: (Table_a.column, Table_b.
    column)
    ......}
}
```

Where query_text is SQL query body, Table_a and Table_b are the tables in the query and the relationship represents the condition/relationship between the two tables.

For example, the output of the query parser for the above example SQL query is as follows:

```
{query_text:{
    (MDM.L1_MDM_PERSON, MDM.L1_MDM_XHRUCUST,
    {Inner Join: (MDM.L1_MDM_PERSON. CONT_ID,
    MDM.L1_MDM_XHRUCUST.CONT_ID)})
    }
}
```

At step 204, the analytic server may extract key phrases from table descriptions by implementing a key phrase extraction model on the table description of each table in one or more databases. The analytic server may download the databases' metadata including (but not limited to) table name and table's description for each table in the databases. The analytic server may implement a key phrase extraction model to extract key phrases and features of each table's description. In this process, the analytic server may utilize natural language processing (NLP) to extract the natural language meanings of the table description. Furthermore, when the analytic server receives user queries requesting tables of certain information, the analytic server may perform the same key phrase extraction process on the user queries to understand the natural language meaning of user's query sentences.

Figure 3B:
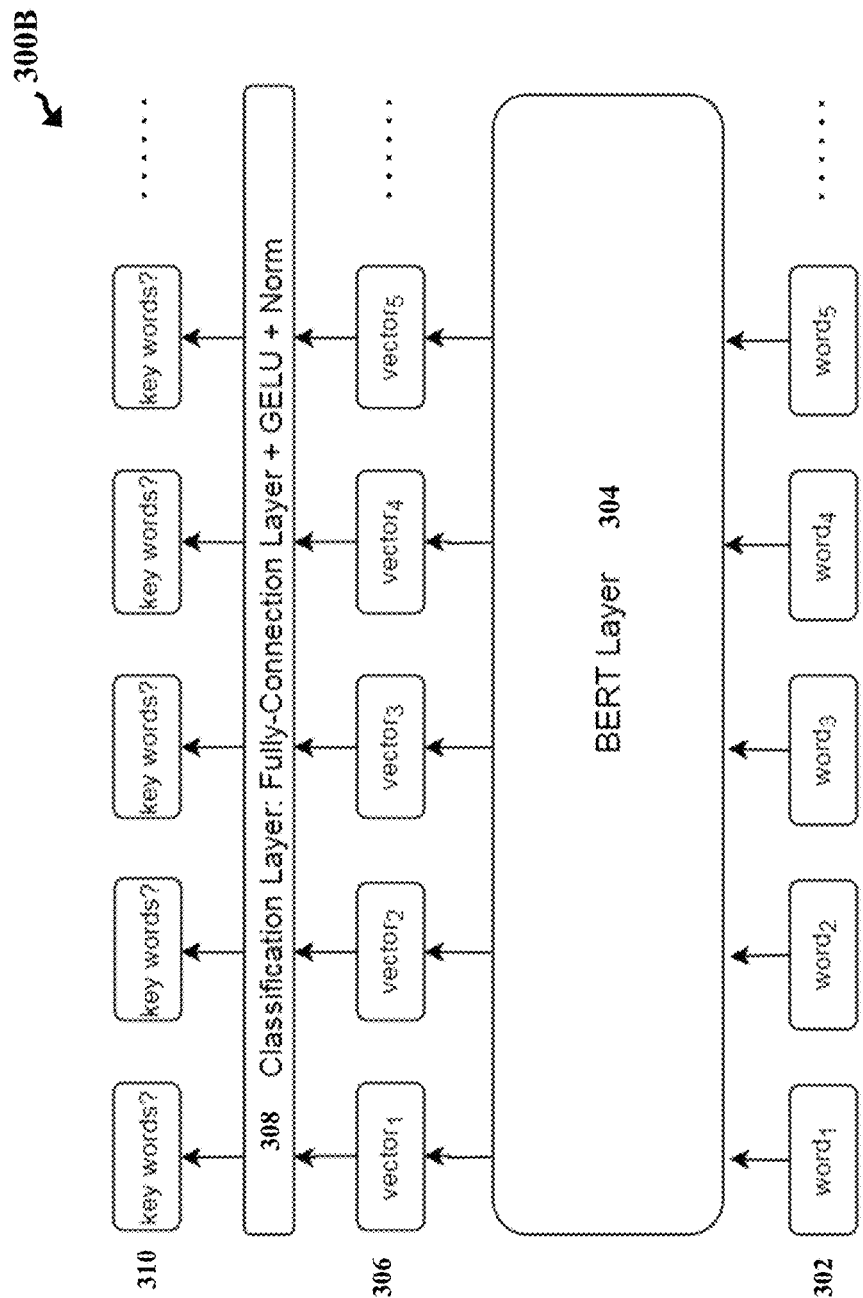
FIG. 3B illustrates an example of model structure of a key phrase extraction model, according to an embodiment.

The analytic server may create the NLP preprocessing key phrase extraction model based on a pre-trained BERT (Bidirectional Encoder Representations from Transformers) model or any other equivalent AI NLP model. FIG. 3B illustrates an example of model structure of the key phrase extraction model 300B, according to an embodiment. Specifically, the analytic server may separate the table description into a set of words 302 and execute the BERT model 304 using the separated words. The BERT layer 304 may generate vectors 306 corresponding to each input word. The analytic server may apply a classification layer 308 to the output vectors from the BERT layer. The classification layer 308 may classify whether each word in its current position within a sentence, query instruction, or a phrase is a keyword 310. By connecting continuous keywords, the analytic server may generate key phrases of the table description. Although the BERT model is pre-trained, the analytic server may apply transfer learning to fine-tune the BERT model for specific use cases in the embodiments disclosed herein.

Based on the key phrase extraction model, the analytic server may extract key phrases from the table description of each table. In a non-limiting example, the table description may be "This table contains information on SAR Filing Reason type codes and their descriptions." After key phrases model, the output can be represented as follows: [O, O, O, O, O, B_K, I_K, I_K, O, B_K, O, O, O] where O indicates that the word may not be important, B_K indicates the beginning word of a key phrase, and I_K indicates a subsequent word of the key phrase. Using the output of the key phrase extraction model, the analytic server may determine the set of key phrases of this table description as ["SAR Filing Reason", "codes"].

Referring back to FIG. 2A, at step 206, the analytic server may train an embedding model based on a corpus including both the tables parsed from the historical query logs and the key phrases extracted from the table descriptions. In operation, the analytic server may combine the tables and key phrases to form a corpus for model training. By analyzing the frequency of combination of key phrases and tables, the analytic server may train an embedding model based on the corpus. The analytics server may train the embedding model to artificially understand (e.g., identify) each table's semantics, usage, and relationships to other tables. The output of the embedding model may be a mapping function that projects each item (e.g., key phrases and tables) in the corpus to a vector, which may be used for semantic search.

The purpose of the embedding module may be to convert key phrases and tables into mathematical representations, such as vectors. A mathematical representation may allow similar items (e.g., key phrases and tables) to be represented in similar ways.

Conventional methods for querying data using table search are generally based on keyword matching. Such methods may only identify the tables including the exact keywords, but may fail to identify other tables that include similar information but do not contain the exact keywords. Conventional methods may also fail to capture the semantics of the user's query and fail to retrieve tables that are semantically similar to the query.

The embodiments disclosed herein may address the problem using the embedding model. The embedding model may determine a vector for each table and/or key phrase, where the vector may capture the semantics of each item (e.g., key phrases and tables). For example, the embedding model may output vectors for words such as "fraud detection" and "money-laundering" and the vectors may be mathematically similar, so that the analytic server may determine that the two words are synonyms. As a result, when the analytic server returns the results for "fraud detection," the analytic server may also return results for "money-laundering," because they are semantically similar in their mathematical representation.

Figure 4:
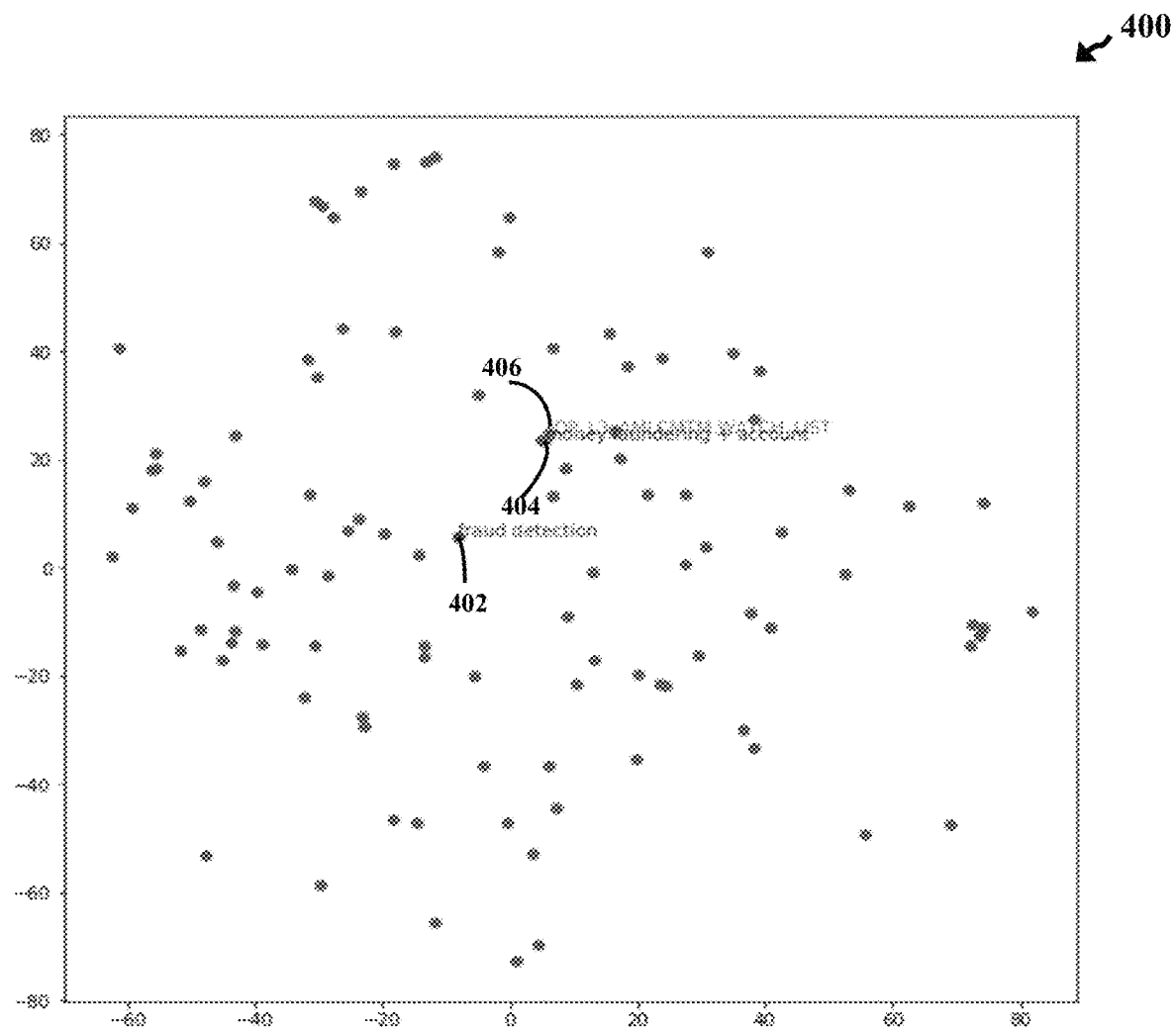
FIG. 4 illustrates a relationship between two semantically similar key phrases, according to an embodiment.

FIG. 4 illustrates the relationship 400 between two semantically similar key phrases, "money-laundering" and "fraud detection," according to an embodiment. The analytic server may execute the embedding model to output a twenty-five dimension vector for each table and key phrase within the corpus. In this figure, the vector of each table and key phrase is projected from twenty-five dimension space into two dimension space. The indicators (e.g., dots/points) in this figure represent the tables and key phrases in the corpus. For example, each dot may represent the two dimension vector of a table or a key phrase. As shown in this figure, the representations of the "money-laundering" 404 and "fraud detection" 402 are close to each other. Furthermore, a table 406 containing a list of people related to "money-laundering" is close to the representation of "money-laundering" 404.

The embedding model may be the continuous set-of-words model (CBOW), which has a use of converting words to vectors. In the embodiments disclosed herein, the analytic server may not only convert words (e.g., the key phrases in the corpus), but also convert the tables in the corpus as vectors. The corpus may include both the tables parsed from the historical query logs and the key phrases extracted from the table descriptions. The analytic server may input the items (e.g., tables and key phrases) in the corpus into the embedding model. The embedding model may then output the corresponding vector of each item.

Figure 5A:
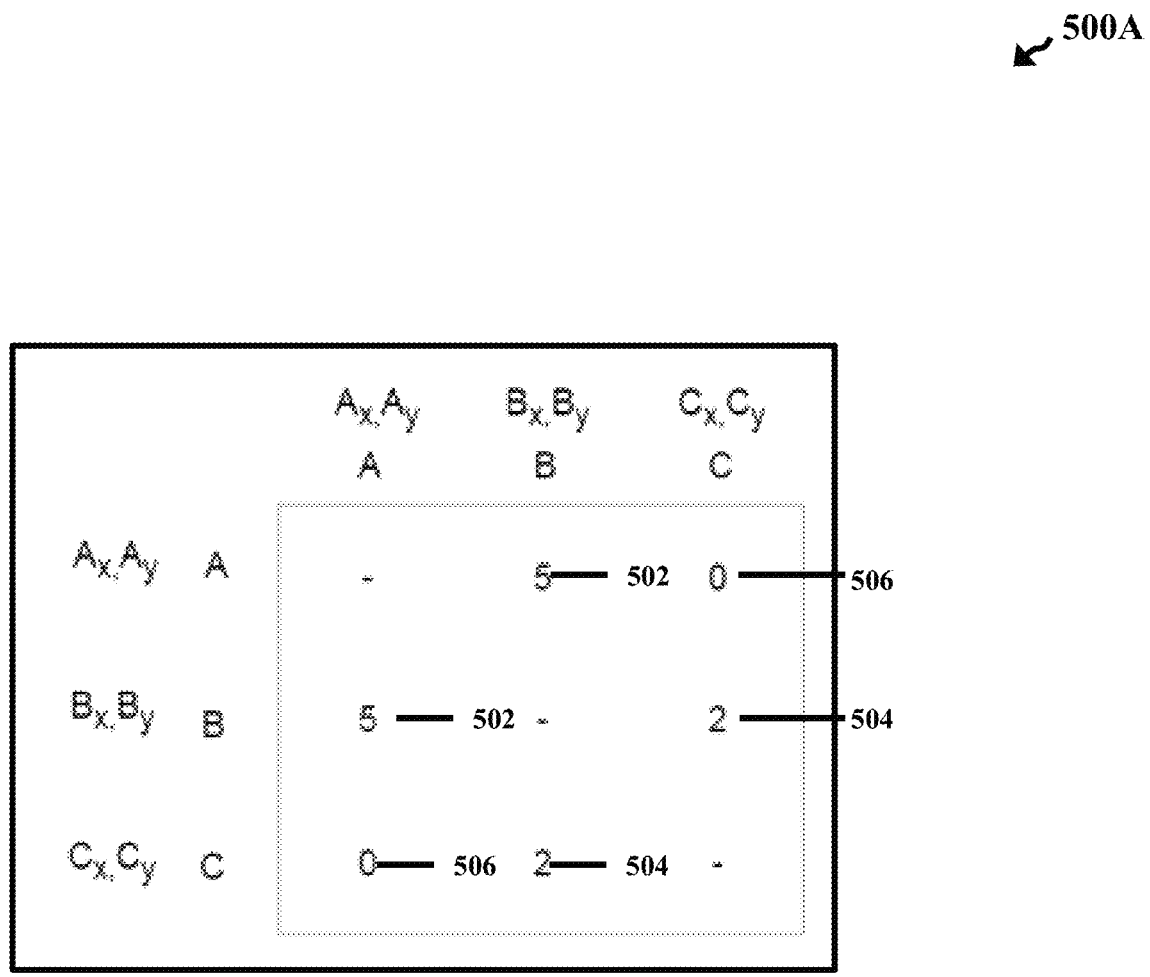
FIG. 5A illustrates a matrix showing the frequency of tables being used together to execute various queries, according to one embodiment.

For the purpose of clarification, the following example will contain only three tables (table A, B, and C). However, a person skilled in the art will appreciate that the analytic server may implement the methods described herein using numerous tables. From the historical log data, the analytic server may find the relations of the three tables, such as the frequency of the tables being used together. FIG. 5A illustrates a matrix showing the frequency of tables being used together, according to one embodiment. The number may represent how often the tables are used together, such as the frequency of Tables A, B, C being used with each other. For example, the number "5" 502 may indicate that the frequency of Table A and Table B being used together is 5. The number "2" 504 may indicate that the frequency of Table B and Table C being used together is 2.

The algorithm for converting the tables and key phrases into vectors may use a twenty-five dimension space. However, for the purpose of illustration, the matrix uses two dimensions to represent the vectors. At first, the analytic server may assign two random numbers to each table (one per dimension). As such, the mathematical representations for the tables are Table A=<$A_x$, $A_y$>, Table B=<$B_x$, $B_y$>, Table C=<$C_x$, $C_y$>. The dot product, also known as scalar product, is a method of transforming the vectors into a single number. The dot product of the vector representations of table A and table B is defined to be A·B=$A_x$*$B_x$+$A_y$*$B_y$, where A·B represents the dot product.

In the process of training the embedding model, the analytic server may apply the CBOW algorithm that attempts to match the dot product of the numbers to how often the tables are used together. The CBOW algorithm executed by the analytic server may change the values of $A_x$, $A_y$, $B_x$, $B_y$, such that $A_x$*$B_x$+$A_y$*$B_y$ (e.g., A·B) will be as close to 5 as possible, where 5 502 is the number of times Table A is used with Table B as shown in the matrix. At the same time, the analytic server may also change the values of $A_x$, $A_y$, $C_x$, $C_y$, such that A·C will be as close to 0 506 as possible. At the same time, the analytic server may change the values of $B_x$, $B_y$, $C_x$, $C_y$, such that B·C will be as close to 2 504 as possible. After the analytic server determines the values of $A_x$, $A_y$, $B_x$, $B_y$, $C_x$, $C_y$, the analytic server may obtain the vector representations of the tables, such as Table A=<$A_x$, $A_y$>, Table B=<$B_x$, $B_y$>, Table C=<$C_x$, $C_y$>. In some configurations, the analytic server may use a gradient descent algorithm to match the dot products to be as close to their target values as possible.

Figure 5B:
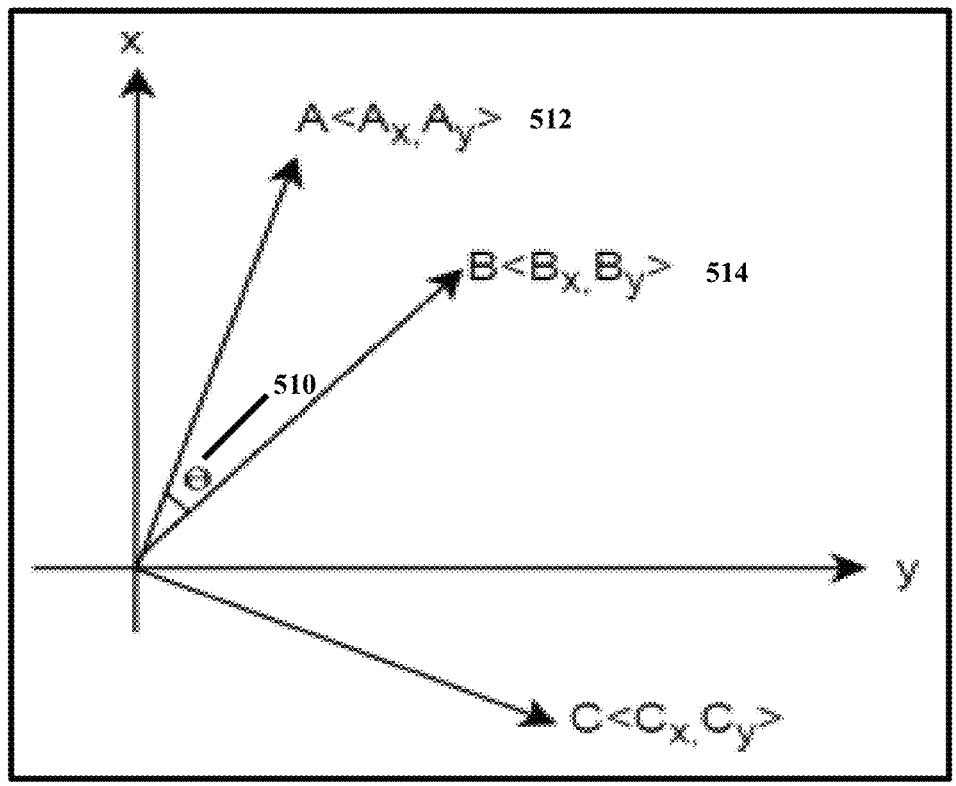
FIG. 5B illustrates vector representations of tables in a vector space, according to an embodiment.

The dot product of two vectors A·B is also equal to their lengths multiplied with the cosine of their angle. The length/magnitude may be calculated by the following formula: Length=$\|A\|$=$\sqrt{A_x^2+A_y^2}$. Thus, A·B=$\|A\|$*$\|B\|$*cos($\theta$), where $\theta$ is the angle between vector A and vector B as shown in FIG. 5B. FIG. 5B illustrates vector representations of tables in the same vector space, according to an embodiment. As shown in the figure, $\theta$ 510 is the angle between vector A 512 and vector B 514.

Because vectors A, B, and C have a constant length, the value of the dot product may depend on the cosine of the angle between the vectors. The cosine of the angle between the vectors is the largest, when $\theta$ (the angle between the vectors) is zero. With the length being constant, if the angle between the vectors is zero, the vectors are mathematically equal to each other. As a result, the analytic server may measure how similar two vectors are using cosine similarity, which is the cosine of the angle between the two vectors. This measurement allows the analytic server to mathematically measure how similar two vectors are. These vectors are representations of the tables and the key phrases within the corpus. Thus, the analytic server may use such measurement to determine how similar two tables are.

By executing the embedding model, the analytics server may generate vectors that represent "fraud detection" and "money-laundering" similarly. The relationship between Table A and Table B may also impact the relationship between Table A and Table C, which may also impact the relationship between Table B and Table C. The impacting of different relationships may be more significant when there are tens of thousands of tables. The interconnectedness of the algorithm may define the relationships between the tables and the key phrases.

The embedding model may be configured to output a vector for each table and key phrase included in the corpus. In implementation of the embedding model, the input is the corpus containing the tables and key phrases relevant to the tables. In the parameter setting of the embedding model, if a query is executed more than a hundred times, the number of executions is truncated to a hundred. The embedding model is set to use twenty-five dimension space and ignore key phrases and tables that have appeared four times or less.

With the above hyper-parameter setting, sufficient data, and appropriate tuning, the model may display the tables with similar semantics close to each other in the vector space, such that the vectors generated by the combination of key phrases that convey the purpose of the tables are mathematically similar to their respective tables.

Figure 5C:
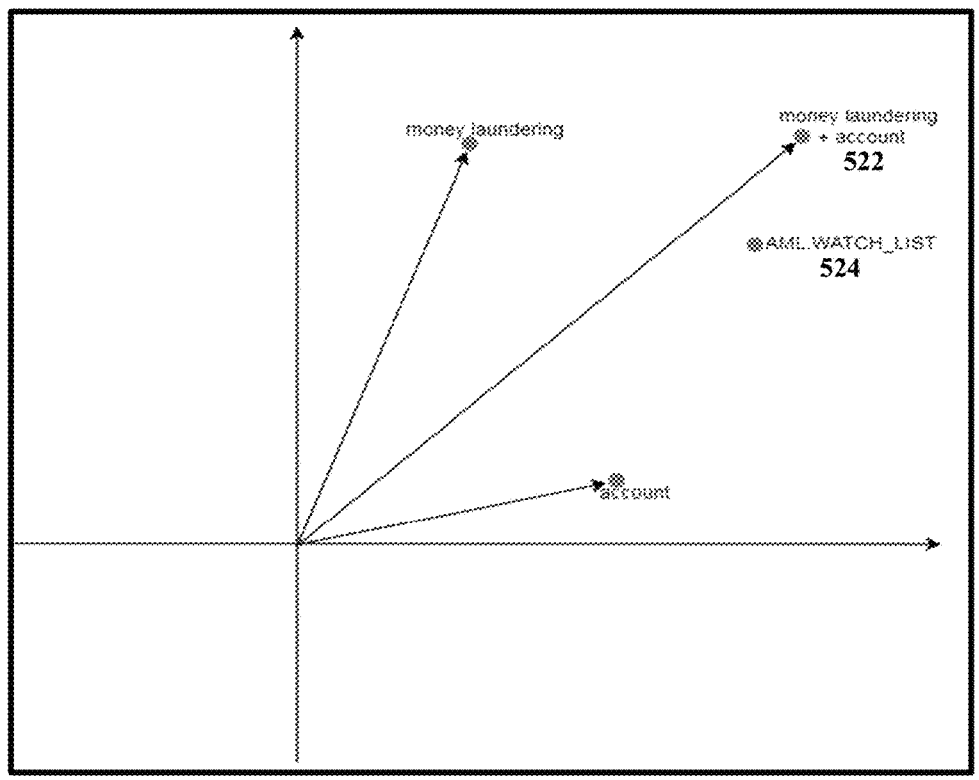
FIG. 5C illustrates the results of an embedding model for a combination vector, according to an embodiment.

FIG. 5C illustrates the results 500C from the embedding model for the multiplicative combination vector of "money laundering" and "account," according to an embodiment. The multiplicative combination vector may be close to the table AML_WATCH_LIST that contains anti-money laundering suspicious accounts. As shown in this figure, the combination vector 522 of "money laundering" and "account" is close to the table AML_WATCH_LIST 524.

Figure 6A:
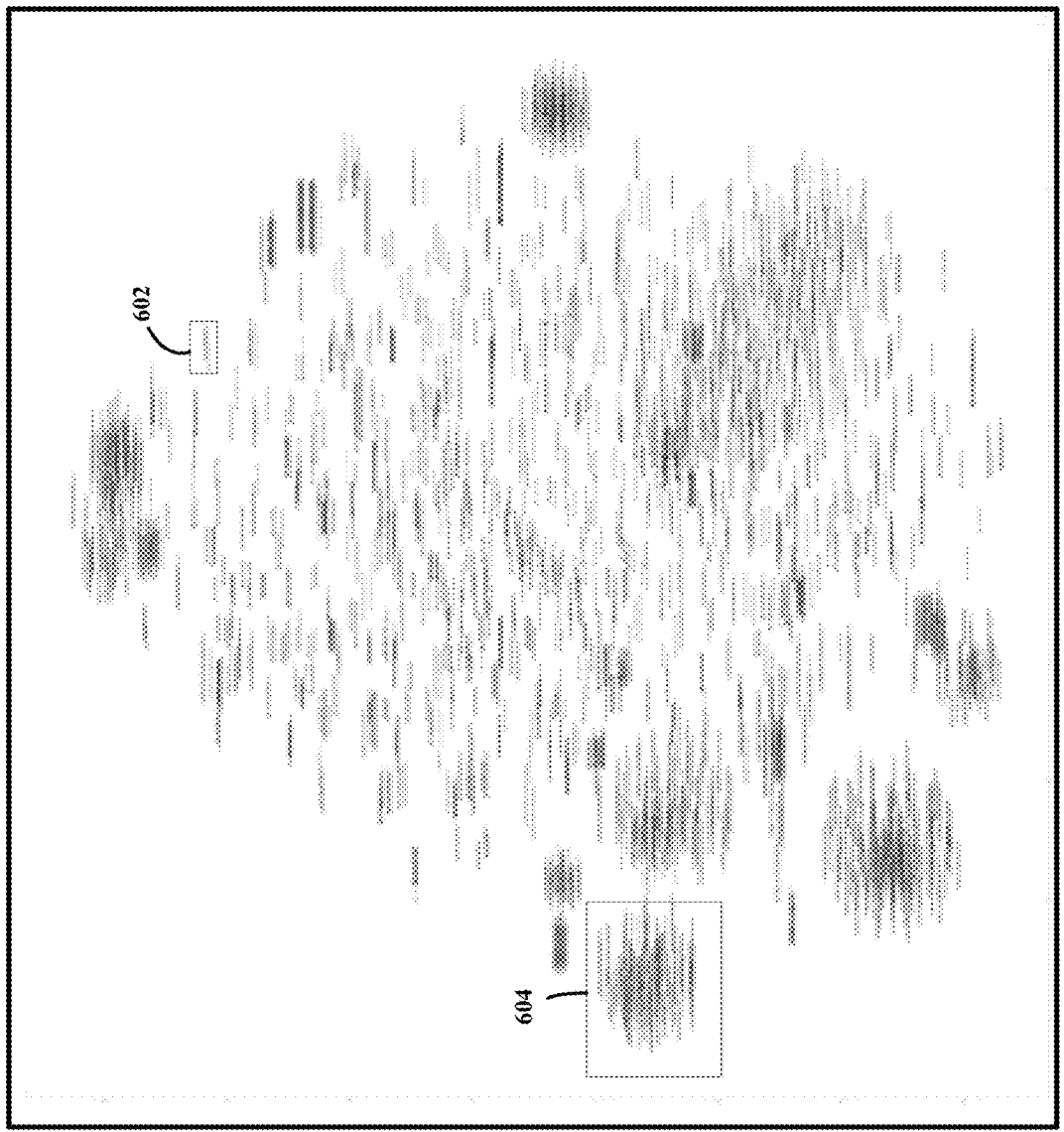
FIG. 6A illustrates the vector representations of tables in a vector space, according to an embodiment.
Figure 6B:
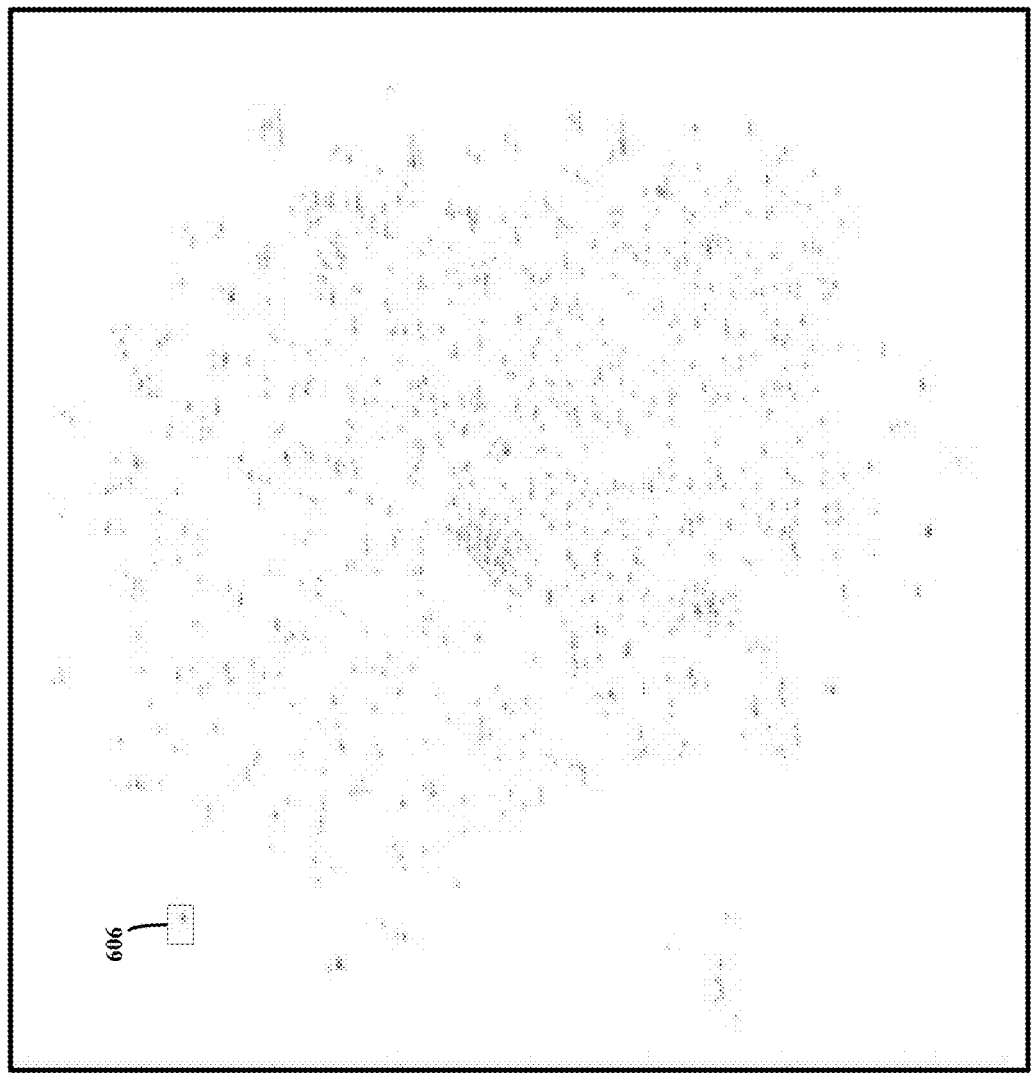
FIG. 6B illustrates the vector representations of key phrases in a vector space, according to an embodiment.

FIG. 6A illustrates the vector representations of the tables in a vector space 600A, according to an embodiment. FIG. 6B illustrates the vector representations of the key phrases in a vector space 600B, according to an embodiment. In some configurations, the analytic server may randomly select a thousand tables' vectors and a thousand key phrases' vectors. The analytic server may then project the vectors from twenty-five dimensions to two dimensions using a t-SNE (t-distributed stochastic neighbor embedding) algorithm, which is an algorithm for dimensionality reduction that is well suited to visualizing high-dimensional data. The related tables are close to each other and form a cloud in the vector space, as shown in FIG. 6A; meanwhile the key phrases are continuously distributed over the vector space, as shown in FIG. 6B.

As illustrated, vector space 600A represents various vector representations of a group of 1000 tables. As described above, the analytics server may perform various analytical protocols to vectorize each table and identify similarities among different tables. As illustrated, some tables (e.g., table 602) may not be similar to other tables. However, some tables may be similar to many other tables and therefore form a cluster/cloud of tables (e.g., cluster 604).

Relational database tables are designed specifically for handling certain data, such as data shown in clusters in FIG. 6A. The related tables form a cloud in the vector space because they can be grouped into similar categories. For example, all the tables for capital markets can be grouped together.

In contrast, the key phrases may be distributed more sparse in the vector space in FIG. 6B. The key phrases being more sparse may be due to certain key phrases being used in multiple tables. For example, the key phrase "transaction" can be a part of many different tables, such as stock buying and selling transactions, credit card transactions, debit card transactions, and the like. Therefore, the distribution of key phrases' vectors may not form clouds. This feature may allow the design to better correlate combinations of words. For example, "account" may not locate requested tables, but the combination vector of "money laundering" and "account" can locate the tables related with anti-money laundering. As illustrated, the vector space 600B represents many vector representations of various key phrases. For instance, point 606 represents a vector representation of a key phrase.

Referring back to FIG. 2A, at step 208, the analytic server may generate a graph database based on the output table relationships from the query parser to build a relationship graph. Specifically, the graph database may comprise a graph generated by the analytic server based on the relationships between the tables. The graph comprises a set of nodes interconnected via a set of edges where each node corresponds to a table and each edge corresponds to at least one relationship between at least two tables. As a result, the graph (e.g., graph database) may output how the tables are connected together based on the historical usage.

By the nature of database design, the tables in databases cannot be as flexible as natural language. The tables are limited by the data lineage and design purpose. Even two tables that have similar semantic meanings cannot be used without a proper understanding of the relationship between them. For example, the corporate account table may not be joined with the personal account table even though both of these tables contain account information. Therefore, to provide more valuable information, it is desirable to provide more details on the relationships of the tables and how they are related to each other.

The graph database may provide the relationships among the tables extracted from the query parser. The graph database may also incorporate/provide snippets from historical queries. The query parser may output the name and relationships of the tables. For example, the output of the query parser may provide the following format of data:

```
{query_text:{
    (Table_a, Table_b, {relationship: (Table_a.column, Table_b.column)
    ......}
}
```

In this example, the query parser outputs two tables: Table_a and Table_b. The query parser also outputs the relationship between the two tables. More specifically, the query parser may illustrate the column within each table that connects the two tables.

Figure 7:
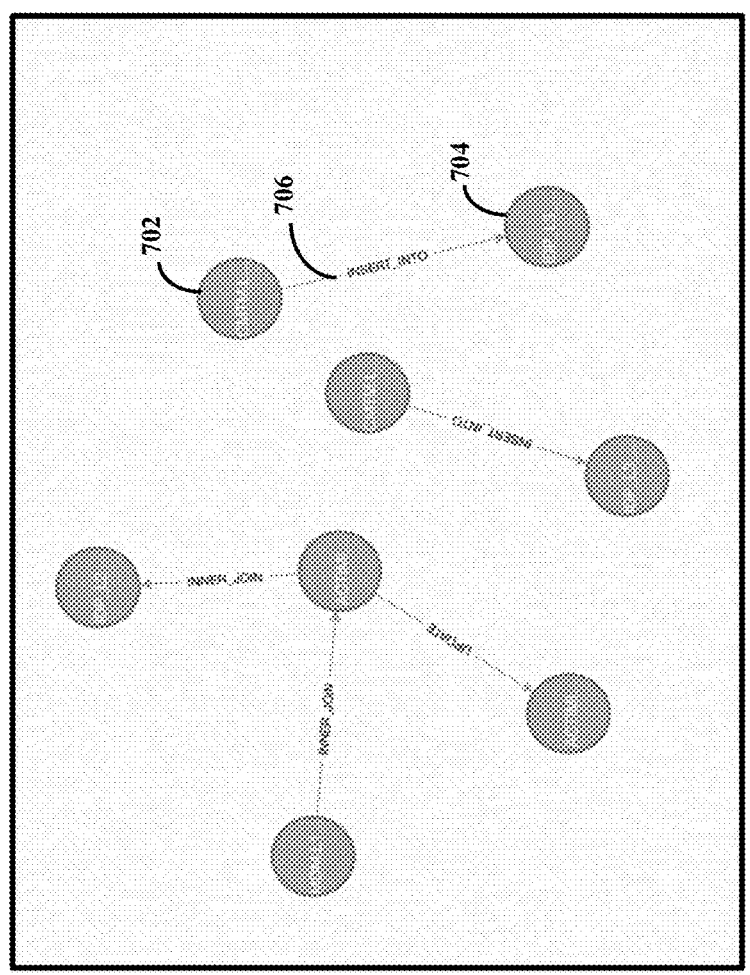
FIG. 7 illustrates an example of a subset of a graph database, according to an embodiment.

Based on the output of the query parser, the analytic server may generate a graph database with tables as nodes and with table name and schema as a node's properties and operations as edges with columns and query text (e.g., query code snippets) as edges' properties. FIG. 7 illustrates an example of a subset of the graph database 700, according to an embodiment. As shown in this figure, the nodes represent the tables with table names as the nodes' properties. The edges represent the relationships of the tables with the query code snippets (e.g., details on how the tables are being connected) as the edges' properties. For instance, a first table 702 and a second table 704 may be connected with each other via a relationship 706. The graph database may allow the set of tables to be queried based on their relationships and connections.

Referring back to FIG. 2A, at step 210, the analytic server may receive a query command (e.g., a query sentence, a question) and generate a combination vector for the query command. The analytic server may process users' query commands and return the search results based on a natural language recommendation module. In the natural language recommendation module, the analytic server may implement the key phrase extraction model to extract key phrases from the query sentence. The analytic server may retrieve the vectors representing the key phrases. The analytic server may further normalize the vectors and combine the vectors into a combination vector.

When the analytic server receives a query sentence from an electronic user devices, the analytic server may reuse the NLP preprocessing key phrase extraction model to extract key phrases from the query sentence. In some embodiments, to improve the query accuracy, the analytic server may return the extracted key phrases to the user/administrator to confirm. The user may tag positive (include) and negative (exclude) key phrases. For example, the analytic server may display the query key phrases extracted from the query sentence on a graphical user interface of the electronic user devices. The analytic server may receive inputs (e.g., tags) indicating a positive status or a negative status of each query key phrase. The analytic server may determine the combination vector by summing the vectors of query key phrases with the positive status and subtracting the vectors of query key phrases with the negative status. Specifically, the analytic server may retrieve all vectors representing the query key phrases. The analytic server may normalize all of the vectors. The analytic server may then sum the vectors of positive key phrases and subtract the vectors of the negative key phrases to generate the combination vector.

At step 212, in the natural language recommendation module, the analytic server may calculate a similarity score between each table in the databases and the query command (e.g., query sentence, question), return and rank a list of tables whose similarity scores satisfy a threshold and generate a subset of the graph (e.g., graph database) including the list of tables. The analytic server may display the list of tables corresponding to a subset of the nodes and their respective edges within the graph. The subset of nodes correspond to the list of tables that satisfy the similarity score threshold.

The similarity score may be represented by cosine similarity. The analytic server may calculate the cosine similarity based on the vector of each table and the combination vector of the query sentence. The analytic server may select the top N (where N is a predefined positive integer) most similar tables as the results for the query. Alternatively, the analytic server may select the most similar tables whose cosine similarity satisfies a threshold (e.g., a predetermined value). These tables may be a list of tables that are semantically similar to the query sentence and include the information relevant to the query sentence. The analytic server may return the list of tables to the electronic user device.

The analytic server may rank the list of tables based on the respective similarity scores. For example, the analytic server may order the returned tables based on the ranking of the cosine similarity. The analytic server not only retrieves a list of tables that are semantically similar to the query sentence, the analytic server may also provide relations of these tables and how they are related to each other using the graph database.

As discussed above, the query parser may extract the table connections and relationships based on the historical usages. The analytic server may generate the graph database by using the output of the query parser to build a relationship graph for all the tables in the databases.

The results returned for the user query sentence may include a list of tables semantically similar to the query sentence, which is a subset of all the tables in the databases. The analytic server may provide a subset of the graph database including the returned tables to show how the returned tables are connected together and the relationships of these tables. Specifically, in the subset of the graph database, the nodes may represent the returned tables with table names as the nodes' properties and the edges may represent the relationships of the returned tables with the SQL code snippet as the edges' properties. The analytic server may transmit the list of tables ranked based on the similarity scores and the subset of the graph database to the electronic user device to satisfy the user query received.

The analytic server may then execute the query command received at step 210 based on the subset of tables identified (e.g., tables that satisfy a similarity threshold or top number or portion of tables after the tables have been ranked). As a result, the analytic server may expand the end user's query command to other tables not identified by the end user. For instance, the analytic server may receive a query command and a corresponding table to search and implement the query command. However, using the methods and systems described herein, the analytic server may further identify additional tables not identified (or not known) to the end user. The analytic server may display a prompt and notify the end user regarding the additional tables. The analytic server may also automatically execute the query command (on the additional tables) and provide additional results to the user that were not specifically requested by the end user.

In step 214, the analytic server may retrain the models periodically (including the query parser, the key phrase extraction model, the embedding model, and the graph database). When new data is added to the tables and/or table descriptions are updated, the analytic server may need to retrain the models to reflect those changes in order to output accurate/updated results. However, in some configurations, none of the new tables may be included in a historical log.

Thus, the analytic server may require a time delay after a new table is added and before the models are retrained. The time delay may allow users to query the new table and create historical logs on the new table. In some embodiments, the time delay may be a month. Alternatively, the time delay may be any predetermined time period. For example, the analytic server may retrain the models once per month in order to allow new tables to be queried and to ensure the models return accurate results.

In some embodiments, the analytic server may retrain the models based on the users' feedback. For example, when the analytic server recommends a list of tables, a user may select which tables are relevant, which tables are not related to the query. The analytic server may leverage such information from the user's feedback and retrain the models to dynamically fit the user's needs.

Figure 2B:
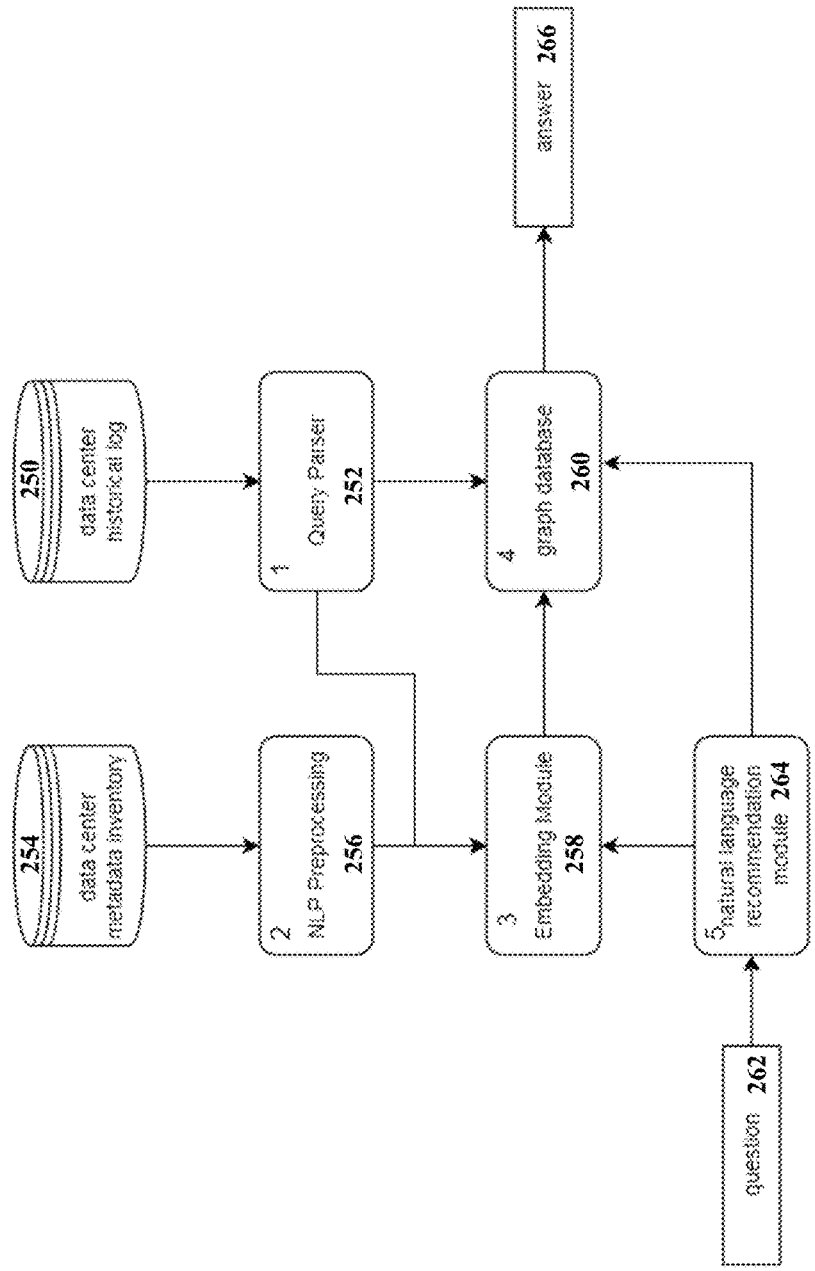
FIG. 2B illustrates a system context diagram, according to an embodiment.

FIG. 2B illustrates a system context diagram 200B, according to an embodiment. As shown in the figure, the analytic server may download the historical queries from the data center historical log 250. The analytic server may use a query parser 252 to extract the tables and the relationships of the tables from the historical queries. The analytic server may also receive table descriptions from the data center metadata inventory 254. The analytic server may use the NLP preprocessing key phrase extraction model 256 to extract key phrases from the table descriptions. The analytic server may generate a corpus by combining the tables extracted from the query parser 252 and the key phrases extracted by the NLP preprocessing 256. The analytic server may train an embedding model 258 using the generated corpus. The embedding model 258 may output a vector for each table and key phrase in the corpus. The analytic server may also generate a graph database 260 based on the output table relationships of the query parser to build a graph where tables are the nodes and edges represent the relationships among the tables.

When the analytic server receives a query sentence 262 from an electronic user device, the analytic server may process the users' query sentence and return the search results based on a natural language recommendation module 264. In the natural language recommendation module 264, the analytic server may implement the key phrase extraction model to extract key phrases from the query sentence and determine a combination vector for the query sentence based on the output of embedding model 258. The analytic server may calculate a similarity score between each table in the databases and the query sentence based on the vector of the table and the combination vector of the query sentence. The analytic server may select the most similar tables based on the similarity scores. The analytic server may also generate a subset of the graph database 260 including the most similar tables to show how these tables are connected. The analytic server may transmit the most similar tables and the subset of the graph database to the electronic user device as an answer 266 to satisfy the user's query.

Figure 8:
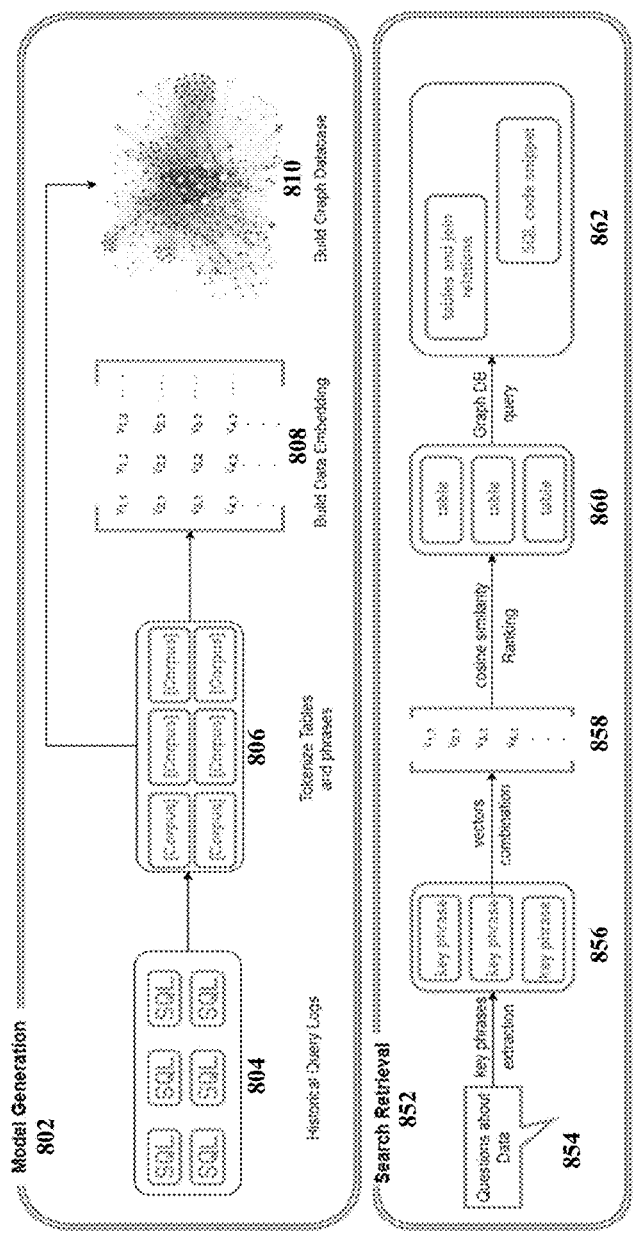
FIG. 8 illustrates a system pipeline, according to an embodiment.

FIG. 8 illustrates the system pipeline 800, according to an embodiment. The system pipeline may comprise a visual representation of data flow in the system described herein. The system described herein may comprise a model generation subsystem 802 and a search retrieval subsystem 852. In the model generation subsystem 802, the input is historical query logs 804 (e.g., SQL query logs) and table descriptions. These SQL query logs (historical query logs 804) contain raw SQL code, and the table descriptions are descriptions for the tables. The analytic server may parse the historical query logs 804 and extract the tables and the relationships of the tables. The analytic server may also extract key phrases from the table descriptions.

The analytic server may generate a corpus 806 by combining the tables extracted from the query parser and the key phrases extracted from the table descriptions. The analytic server may transform the query logs and table descriptions into tables and key phrases in the corpus. The tables and key phrases may be stored in the persistent storage. Based on the tables and key phrases in the persistent storage, the analytic server may train the embedding model 808, which is configured to output a vector for each table and key phrase. The trained embedding model may be stored as a machine learning model file, which is the first output of the model generation subsystem 802, stored in the persistent storage. The analytic server may further use the table relationships from the query parser to generate a graph database 810, which is the second output of the model generation subsystem 802 that is also stored in the persistent storage.

The input to the search retrieval subsystem 852 may be a user query, such as a natural language question 854. The analytic server may transform the natural language question into key phrases 856 stored in volatile storage (e.g., main memory). The analytic server may load the embedding model into the main memory and transform the key phrases into vectors in vector space. The analytic server may generate a combination vector 858 for the natural language question by combining/merging the transformed vectors of the key phrases. After determining the combination vector, the analytic server may calculate the cosine similarity score between the natural language question and the tables, and determine the most similar tables 860 based on the cosine similarity scores. The analytic server may store the list of the most similar tables 860 in the volatile storage before returning them to the user. The analytic server may also generate a subset of the graph database 862 that includes the list of the most similar tables to show the relationships (e.g., joint relations) of these tables. The edges of the subset of the graph database may represent the relationships with the SQL code snippet as the edge properties.

Non-Limiting Example

In a non-limiting example, the analytic server may receive a query from an electronic user device. The query may be a sentence that requests money laundering accounts within an organization. The query may also instruct the analytic server to exclude enterprise accounts. The analytic server may extract the key phrases from the query as "money laundering"+"account"−"enterprise." The analytic server may combine the vectors of these key phrases to obtain the combination vector. The analytic server may retrieve the tables most similar to the combination vector by calculating the similarity score of each table and selecting the higher ranked tables. For example, the following list is the top 10 tables that may relate to the user query sorted by the similarity score:

```
[('MDM.L1_MDM_XHRUCUST', 0.7519886493682861),
    ('MDM.L1_ MDM_XHRUCUST_PREPROD', 0.7385485768318176),
    ('IDP_L2.PARTY', 0.7301493883132935),
    ('ACTIMIZE.L3_PARTY_SURROGATE_KEY_ALL', 0.7256467938423157),
    ('ACTIMIZE.L3_PARTY', 0.7200987339019775),
    ('IDP_L3_AMLCMTM.WATCH_LIST_ENTRY', 0.7057322859764099),
    ('IDP_L3_AMLCMTM.WATCH_LIST', 0.7054437398910522),
    ('CMTM.L0_WATCH_LIST', 0.6767995357513428),
    ('CMTM.L0_WATCH_LIST_ENTRY', 0.665833055973053),
    ('MDM.L1_MDM_XHIGHRISKCONTACT_PREPROD', 0.601058840751648),
]
```

The tables in the list may be retrieved from several different historical queries that are related to the user query. Furthermore, the tables in the list may be mainly from the following three different historical queries:

```
['ACTIMIZE.L3_PARTY','ACTIMIZE.L3_PARTY_SURROGATE_KEY_ALL','IDP_L2.PARTY',
'MDM.L1_MDM_XHRUCUST']
['CMTM.L0_WATCH_LIST', 'IDP_L3_AMLCMTM.WATCH_LIST']
And
['CMTM.L0_WATCH_LIST_ENTRY', 'IDP_L3_AMLCMTM.WATCH_LIST_ENTRY']
```

Based on such historical queries, the analytic server may identify and display the connections/joins among the returned tables in a subset of the graph database. For example, the subset of the graph database may include the returned tables as the nodes and provide the relationships among the tables as edges using query snippets from the historical queries. FIG. 7 illustrates an example of a subset of the graph database. As depicted, the nodes represent the tables with table names as the nodes' properties. The edges represent the relationships of the tables with the query code snippets (e.g., details on how the tables are being connected) as the edges' properties.

The foregoing method descriptions and process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

When implemented in hardware, the functionality may be implemented within circuitry of a wireless signal processing circuit that may be suitable for use in a wireless receiver or mobile device. Such a wireless signal processing circuit may include circuits for accomplishing the signal measuring and calculating steps described in the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

Any reference to claim elements in the singular, for example, using the articles "a," "an" or "the," is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method comprising:
   parsing, by a server, historical queries from a historical query log to extract from the historical query log a plurality of tables associated with the historical queries and relationships between the plurality of tables;
   extracting, by the server, key phrases by executing a key phrase extraction model for a table description of each table;
   generating, by the server, a corpus by combining the tables extracted from parsing and the key phrases extracted from the table descriptions;
   training, by the server based on the corpus, an artificial intelligence model by analyzing a frequency of combination of the tables and the key phrases in the historical queries to identify relationships between tables in the corpus, wherein the artificial intelligence model is configured to output a vector for each table and key phrase included in the corpus, the vector generated based at least on a semantic meaning of each table and key phrase;
   generating, by the server, a graph based on the relationships between the tables, wherein the graph comprises a set of nodes interconnected via a set of edges where each node corresponds to a table and each edge corresponds to a relationship between at least two tables;

upon receiving a query command, extracting, by the server, query key phrases by executing the key phrase extraction model for the query command;

determining, by the server, a combination vector for the query command based on vectors of the query key phrases;

calculating, by the server, a similarity score between the query command and each table based on the combination vector of the query command and the vector of each table; and displaying, by the server, one or more tables corresponding to a subset of the set of nodes and their respective edges within the graph, wherein the subset of the set of nodes corresponds to the one or more tables that satisfy a similarity score threshold.

2. The method of claim 1, wherein the similarity score between the query command and each table is a cosine similarity between the combination vector of the query command and the vector of each table.

3. The method of claim 1, further comprising:
generating, by the server, a parse tree for each historical query by decomposing and labeling each semantic part of the historical query; and
extracting, by the server, the tables and the relationships between the tables by traversing the parse tree of each historical query.

4. The method of claim 1, wherein implementing the key phrase extraction model comprises:
separating, by the server, the table description into a set of words;
determining, by the server, whether each word in a current position is a keyword; and
generating, by the server, the key phrases of the table description by connecting continuous keywords.

5. The method of claim 1, further comprising:
displaying, by the server, the query key phrases on a graphical user interface;
receiving, by the server, inputs indicating a positive status or a negative status of each query key phrase; and
determining, by the server, the combination vector by summing the vectors of query key phrases with the positive status and subtracting the vectors of query key phrases with the negative status.

6. The method of claim 1, wherein the one or more tables are ranked based on the similarity scores.

7. The method of claim 1, wherein the server trains the artificial intelligence model using a gradient descent algorithm.

8. The method of claim 1, wherein the graph comprises table names as properties of at least one node, and query code snippets as properties of the edges.

9. The method of claim 1, further comprising:
receiving, by the server, a user selection from the one or more tables; and
retraining, by the server, the artificial intelligence model based on the user selection.

10. The method of claim 1, further comprising:
retraining, by the server, the artificial intelligence model periodically.

11. A system comprising:
a server comprising a processor and a non-transitory computer-readable medium containing instructions that when executed by the processor causes the processor to perform operations comprising:
parse historical queries from a historical query log to extract from the historical query log a plurality of tables associated with the historical queries and relationships between the plurality of tables;
extract key phrases by executing a key phrase extraction model for a table description of each table;
generate a corpus by combining the tables extracted from parsing and the key phrases extracted from the table descriptions;
train based on the corpus, an artificial intelligence model by analyzing a frequency of combination of the tables and the key phrases in the historical queries to identify relationships between tables in the corpus, wherein the artificial intelligence model is configured to output a vector for each table and key phrase included in the corpus, the vector generated based at least on a semantic meaning of each table and key phrase;
generate a graph based on the relationships between the tables, wherein the graph comprises a set of nodes interconnected via a set of edges where each node corresponds to a table and each edge corresponds to a relationship between at least two tables;
upon receiving a query command, extract query key phrases by executing the key phrase extraction model for the query command;
determine a combination vector for the query command based on vectors of the query key phrases;
calculate a similarity score between the query command and each table based on the combination vector of the query command and the vector of each table; and
display one or more tables corresponding to a subset of the set of nodes and their respective edges within the graph, wherein the subset of the set of nodes corresponds to the one or more tables that satisfy a similarity score threshold.

12. The system of claim 11, wherein the similarity score between the query command and each table is a cosine similarity between the combination vector of the query command and the vector of each table.

13. The system of claim 11, wherein the instructions cause the processor to further:
generate a parse tree for each historical query by decomposing and labeling each semantic part of the historical query; and
extract the tables and the relationships between the tables by traversing the parse tree of each historical query.

14. The system of claim 11, wherein implementing the key phrase extraction model comprises:
separating the table description into a set of words;
determining whether each word in a current position is a keyword; and
generating the key phrases of the table description by connecting continuous keywords.

15. The system of claim 11, wherein the instructions further cause the processor to:
display the query key phrases on a graphical user interface;
receive inputs indicating a positive status or a negative status of each query key phrase; and
determine the combination vector by summing the vectors of query key phrases with the positive status and subtracting the vectors of query key phrases with the negative status.

16. The system of claim 11, wherein the one or more tables are ranked based on the similarity scores.

17. The system of claim 11, wherein the server trains the artificial intelligence model using a gradient descent algorithm.

18. The system of claim 11, wherein the graph comprises table names as properties of at least one node, and query code snippets as properties of the edges.

19. The system of claim 11, wherein the instructions further cause the processor to:
- receive a user selection from the one or more tables; and
- retrain the artificial intelligence model based on the user selection.

20. The system of claim 11, wherein the instructions further cause the processor to:
- retrain the artificial intelligence model periodically.

* * * * *